United States Patent [19]

Zimmer

[11] Patent Number: 4,771,652

[45] Date of Patent: Sep. 20, 1988

[54] MANIPULATOR-HEAD DRIVE ASSEMBLY

[75] Inventor: Ernst Zimmer, Friedberg, Fed. Rep. of Germany

[73] Assignee: Kuka Schweissanlagen+Roboter GmbH, Augsburg, Fed. Rep. of Germany

[21] Appl. No.: 944,440

[22] Filed: Dec. 18, 1986

[30] Foreign Application Priority Data

Dec. 19, 1985 [DE] Fed. Rep. of Germany ....... 3545068

[51] Int. Cl.$^4$ .............................................. B25J 17/02
[52] U.S. Cl. ....................................... 74/640; 74/469; 901/26; 901/29
[58] Field of Search ................. 74/417, 640, 469, 479, 74/103; 901/25, 26, 16, 28, 29; 414/735, 733, 738

[56] References Cited

U.S. PATENT DOCUMENTS

| | | | |
|---|---|---|---|
| 4,068,536 | 1/1978 | Stackhouse | 901/26 |
| 4,299,533 | 11/1981 | Ohnaka | 74/103 |
| 4,365,928 | 12/1982 | Baily | 414/735 |
| 4,402,234 | 9/1983 | Malarz et al. | 74/417 |
| 4,507,046 | 3/1985 | Sugimoto et al. | 414/735 |
| 4,548,097 | 10/1985 | Zimmer | 901/26 |
| 4,574,655 | 3/1986 | Kimura et al. | 74/640 |
| 4,579,016 | 4/1986 | Soroka et al. | 901/29 |
| 4,627,786 | 12/1986 | Minematsu et al. | 901/26 |
| 4,642,021 | 2/1987 | Kikuchi | 901/29 |
| 4,657,472 | 4/1987 | Zimmer | 901/29 |
| 4,662,815 | 5/1987 | Zimmer | 901/29 |

FOREIGN PATENT DOCUMENTS

| | | | |
|---|---|---|---|
| 133499 | 2/1985 | European Pat. Off. | 901/29 |
| 209111 | 1/1987 | European Pat. Off. | 901/29 |
| 3431033 | 3/1985 | Fed. Rep. of Germany | |

Primary Examiner—Lawrence Staab
Attorney, Agent, or Firm—Herbert Dubno; Andrew Wilford

[57] ABSTRACT

A head assembly for a manipulator has a rear segment rotatable about an inner axis fixed relative to the manipulator and extending through the rear segment, an intermediate segment supported on the rear segment for rotation about an intermediate axis defined by the rear segment and intersecting the inner axis at an acute intermediate angle open away from the rear segment, and a front segment having a holder adapted to carry a tool and suppported on the intermediate segment for rotation about an outer axis fixed relative to the intermediate segment, extending through the front segment, and intersecting the intermediate axis at an acute outer angle open away from the intermediate segment. A drive rotates the intermediate and outer segments on the inner and intermediate segments about the respective intermediate and outer axes. The drive has an intermediate shaft extending along the intermediate axis, an outer shaft extending along the outer axis, angle gearing interconnecting the intermediate and outer shafts for joint synchronous rotation, an intermediate stepdown transmission with a high stepdown ratio of N:1 connected between the intermediate shaft and the intermediate segment for relatively slowly rotating the intermediate segment relative to the intermediate shaft, and an outer stepdown transmission with a high stepdown ratio of (N+/−1):1 connected between the outer shaft and the front segment for relatively slowly rotating the intermediate segment relative to the intermediate shaft. The factor N is a whole number of revolutions.

5 Claims, 5 Drawing Sheets

MANIPULATOR-HEAD DRIVE ASSEMBLY

FIELD OF THE INVENTION

The present invention relates to a robot or manipulator. More particularly, this invention concerns a drive assembly for such a manipulator.

BACKGROUND OF THE INVENTION

As described in copending patent application Ser. No. 742,280 filed June 7, 1986 (now U.S. Pat. No. 4,657,472) a standard manipulator has a stationary base on which a carousel can be rotated about a vertical axis by a motor mounted on the base. A main support arm is pivotal on the carousel about an inner horizontal axis perpendicularly intersecting the vertical axis by means of another motor mounted on the carousel. A counterweight is provided for counterbalancing the offcenter weight of the main arm and the structure carried by it.

The outer or upper end of the main arm carries an outrigger arm rotatable on the main arm about an outer horizontal axis by means of yet another motor carried on the main arm. The outer end of this outrigger arm in turn carries a so-called head assembly that in turn carries the tool, for instance a welding electrode.

This head assembly itself comprises inner, intermediate, and front segments pivotal about respective axes, with the outer and inner axes forming with the intermediate axis respective outwardly and inwardly open acute angles.

The inner side of the rear segment carries the drive shafts for the head parts and also for a tool holder concentric to the front segment. Drives with high stepdowns, at least 50:1, connect the shafts to the respective parts while bevel gearing connects succeeding shafts to one another.

This arrangement is supposed to provide the maximum reach for the tool while being as compact as possible. As a result of the relative inclinations of the various axes it is possible to direct the tool from the front segment inward back toward the support formed normally by the outer end of the outer arm. In fact the tool can lie on an axis parallel to the base axis, which typically is the longitudinal axis of the outer arm, and can point from the outer head part back to the base.

In such devices there are three concentric drive shafts in the front segment. Since normally there are four different relatively movable parts (for instance the three head segments and the tool) it is not uncommon to couple two of the segments together so they can both be driven by one of the shafts.

As also described in German patent document No. 3,431,033 the inner and front segments are coupled together by a bevel gearing. In this manner the front segment rolls off on the rear segment as the intermediate segment is rotated.

In such systems the shafts can be fairly slim and compact since the high stepdown at the outermost point in the gear train makes any minor losses or inefficiencies that exist upstream in the drive train inconsequential. Slip of, for instance, 1° in an upstream gear train is reduced by a standard harmonic transmission with a 100:1 ratio to 0.01°, a normally negligible amount.

The transmissions are of the high-ratio and extremely compact harmonic type which basically have three parts. The rear segment or so-called wave generator is of elliptical section and supports via an array of rollers a flexible toothed belt or so-called flexspline having external teeth that mesh at two diametrically opposite locations with two juxtaposed ring gears.

One of these ring gears is called the circular spline, is normally fixed, and normally has two more teeth than the flexspline. The other ring gear is called the dynamic spline, is normally rotatable, but has the same number of teeth as the flexspline.

Such a transmission is extremely compact and is capable of transmitting considerable torque. In addition it has very little slip, and converts torque purely into torque so that it does not load the support bearings radially or axially. The ratio in such a transmission is normally at least 80:1.

Such transmissions are braced, therefore, between relatively moving parts so that calculating the position of the tool held on the outer head segment becomes a fairly complex task.

In addition such setups normally preclude providing a separate rotary drive for the tool holder on the outer face of the front segment.

OBJECTS OF THE INVENTION

It is therefore an object of the present invention to provide an improved manipulator-head drive assembly.

Another object is the provision of such a manipulator-head drive assembly which overcomes the above-given disadvantages, that is which allows the position of the tool on the front segment to be calculated fairly easily and which makes it easy to provide a separate drive shaft for a tool support on the front head segment.

SUMMARY OF THE INVENTION

A head assembly for a manipulator according to the invention has an rear segment rotatable about an inner or rear segment axis fixed relative to the manipulator and extending through the rear segment, an intermediate segment supported on on the rear segment for rotation about an intermediate axis defined by the rear segment and intersecting the rear axis at an acute intermediate angle open away from the rear segment, and a front segment having a holder adapted to carry a tool and supported on the intermediate segment for rotation about a front segment axis fixed relative to the intermediate segment, extending through the front segment, and intersecting the rear axis at an acute outer angle open away from the intermediate segment.

A drive rotates the intermediate and front segments on the inner and intermediate segments about the respective intermediate and front axes. The drive has an intermediate shaft extending along the intermediate axis, an outer shaft extending along the front axis, angle gearing interconnecting the intermediate and outer shafts for joint synchronous rotation, an intermediate stepdown transmission with a high stepdown ratio of $N:1$ connected between the intermediate shaft and the intermediate segment for relatively slowly rotating the intermediate segment relative to the intermediate shaft, and an outer stepdown transmission with a high stepdown ratio of $(N+/-1):1$ connected between the outer shaft and the front segment for rotating on the intermediate segment. As a result accurately calculating or predicting the position of the front segment is easy.

With the system of this invention, using harmonic transmissions such as described above having a flexspline (FS below) driven by a wave generator (WG) and meshing with both a circular spline (CS) having more teeth than the flexspline and a dynamic spline (DS) having the same number of teeth as the flexspline, the ratio is determined both by the relative numbers of teeth and whether the output is taken off the circular or dynamic spline, as invariably the wave generator is the driven input member.

Thus assuming that the transmission has a number Z of teeth equal to 200 in the flexspline and dynamic spline and 202 in the circular spline, the following ratio i is obtained when the output is taken off the dynamic spline:

$$i = n_{WG}/n_{DS} = Z_{DS}/(Z_{DS} - Z_{CS}) = 200/-2 = -100.$$

Similarly when the output is taken off the circular spline:

$$i = n_{WG}/n_{CS} = Z_{CS}/(Z_{CS} - Z_{DS}) = 202/2 = +101.$$

The difference in sign indicates that the output directions are opposite.

Thus using two identical transmissions, which are of a type ideal for this robot-arm application, it is possible to obtain two different ratios that are perfectly matched, due to the compensating action of the angle gearing, to cancel out the effect of the movement of the intermediate segment with respect to movement of the front segment.

According to one feature of this invention both of the transmissions, which are of the harmonic type, are oppositely connected with respect to their circular and dynamic splines to achieve the difference in stepdown.

It is also possible to use harmonic transmissions having splines with different numbers of teeth.

The assembly of the invention can also have a tool holder rotatable on the front segment about an axis intersecting the outer axis and forming therewith a tool angle open away from the intermediate segment, respective secondary inner or rear, intermediate, and outer or front shafts extending along the respective axes in the respective segments, and secondary angle gearing interconnecting the secondary shafts in a train with the tool holder for joint rotation. Thus a tool held by this holder can be rotated so that when this tool is not straight yet another degree of motion is obtained.

BRIEF DESCRIPTION OF THE DRAWING

The above and other objects, features and advantages of the present invention will become more readily apparent from the following description, reference being made to the accompanying highly diagrammatic drawing in which.

SPECIFIC DESCRIPTION

Figure 1:
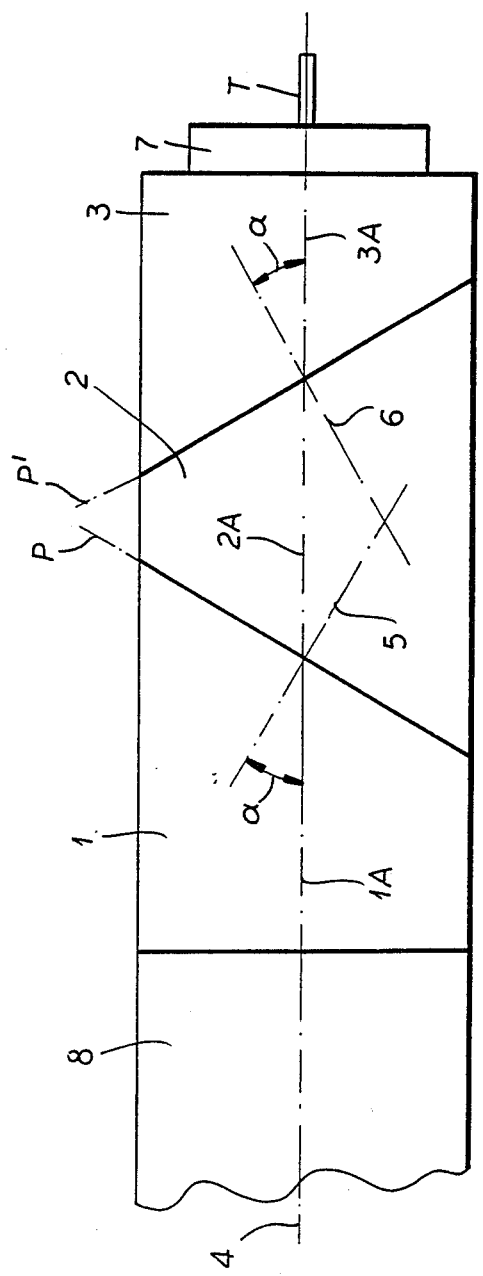
FIG. 1 is a mainly schematic side view illustrating a manipulator head assembly according to this invention.

As seen in FIG. 1 the head assembly according to this invention basically comprises inner, intermediate, and front segments 1, 2, and 3 that are centered on respective axes 1A, 2A, and 3A and that abut each other flatly at planes P and P' which intersect at an angle of 60°.

The inner or rear segment 1 is mounted on a support part or outrigger arm indicated schematically at 8 for pivoting thereon about its axis 1A which is always coaxial with the axis 4 of the support 8. The intermediate segment 2 pivots on the outer end of the segment 1 about an axis 5 perpendicular to the plane P and intersecting the axis 1A on the plane P.

Similarly, the outer or front segment 3 pivots on the outer end of the segment 2 about an axis 6 perpendicular to the plane P' and intersecting the axes 2A and 3A on the plane P'. The two axes 5 and 6 intersect at a point offset from the axis 2A.

As seen in FIG. 1, in the aligned, extended or stretched position of the assembly, the axes 1A, 2A, 3A, and 4 are coaxial and the axes 5 and 6 form the sides and axis 2A the base of an isosceles triangle (shown inverted). The axes 5 and 6 extend in the FIG. 1 position at the angle α of 30° to the respective axes 1A and 3A, and the axes 5 and 6 extend at an obtuse angle to each other, although they need not be symmetrical as illustrated.

The front segment 3 is formed with a cylindrical tool holder 7 on which is mounted a tool shown schematically at T. This tool T can be a welding electrode, scribe, or the like.

With the system of this invention, therefore, rotation about any one of the inner axis 1A, intermediate axis 5, or outer axis 6 will move the tool T in a manner wholly different from the type of movement produced by pivotal motion about any other of these axes. Thus there are no situations where the movement of one part will be redundant, that is where the tool T can be set in the exact same position in either of two different ways.

Figure 2:
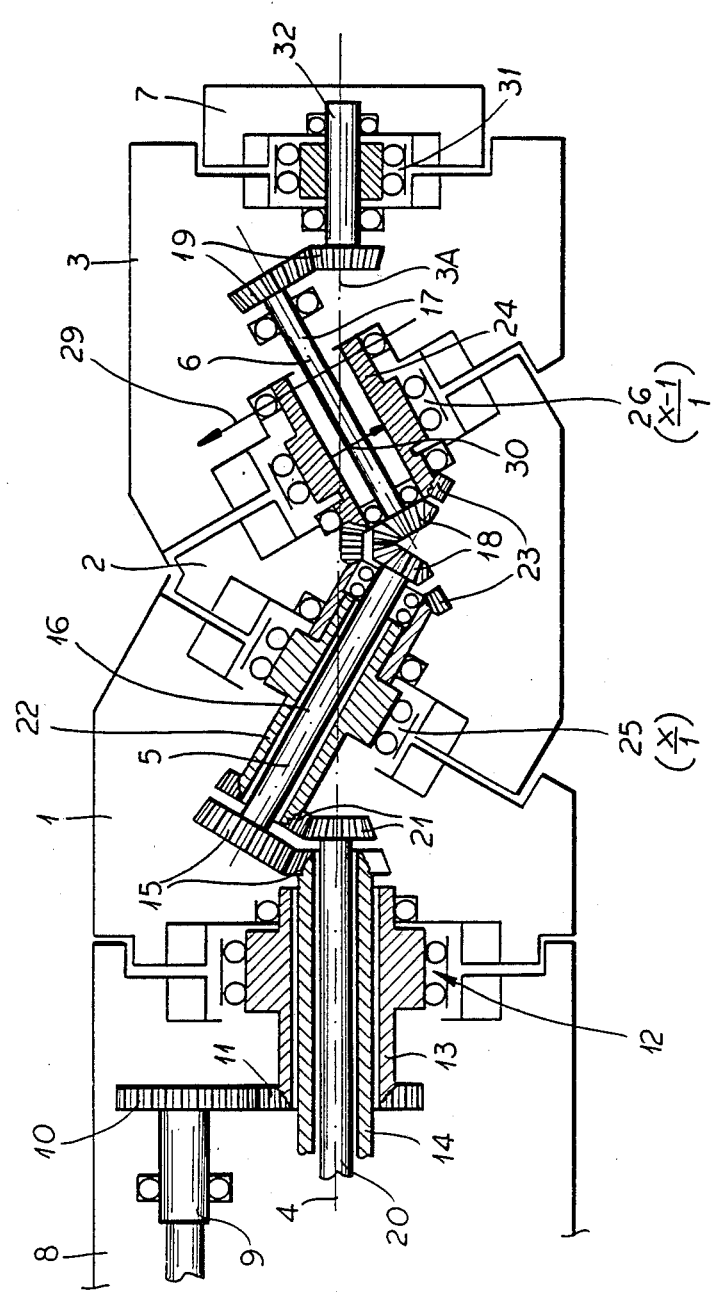
FIG. 2 is a longitudinal section through the assembly of this invention.

As seen in FIG. 2 the base or support part 8 is provided at its axis 4 with a central shaft 20 surrounded by two tube shafts 14 and 13. The outer tube shaft 13 has on its inner input end a gear 11 that meshes with a gear 10 carried on a shaft 9 parallel to the axis 4 and on its output end is connected via a high-ratio harmonic transmission 12 to the inner end of the segment 1. Thus rotation of the shaft 9 will rotate the segment 1 about the axis 1A, 4.

The tube shaft 14 has an outer end connected via bevel gears 15 to the inner end of a core shaft 16 extending along the axis 5 and in turn having an outer end connected via bevel gears 18 to another core shaft 17 extending along the axis 6.

The outer end of the shaft 17 is in turn connected via bevel gears 19 with the inner end of a shaft 32 extending along the axis 3A and connected at its outer end to the tool holder 7 via another high-ratio harmonic transmission 31. Thus high-speed rotation of the shaft 14 will be transmitted via the shafts 16 and 17 to the shaft 32 and thence via the transmission 31 to the tool holder 7 to rotate it about its axis 3A. The gear pairs 15, 18, and 19 transmit the rotation regardless of the relative positions of the axes of the system.

The core shaft 20 has an outer end connected via bevel gears 21 with the inner end of a tube shaft 22 coaxially around the shaft 16 and having a central portion connected via another harmonic transmission 25 to the segment 2 and an outer end connected via bevel gears 23 with another tube shaft 24 coaxially surrounding the shaft 17 and connected via a further harmonic transmission 26 to the segment 3.

Both shafts 22 and 24 are supported by bearings in the intermediate segment 2. The transmission 25 is braced on the rear segment 1 and rotates the intermediate segment 2 relative to the rear segment 1 at a ratio i of x and the transmission 26 is braced on the intermediate segment 2 and rotates the front segment 3 relative to the intermediate segment 2 at a ratio i of $(x-1)$.

The gearing is such that the rotation direction 29 of the front segment 3 is opposite the rotation direction 30 of the shaft 24.

This difference between the stepdown ratios i of the transmissions 25 and 26 and the opposite rotation directions of the shafts and head parts causes the two parts 2 and 3 to rotate identically although they are driven from a common shaft and do move relative to each other.

Figure 3:
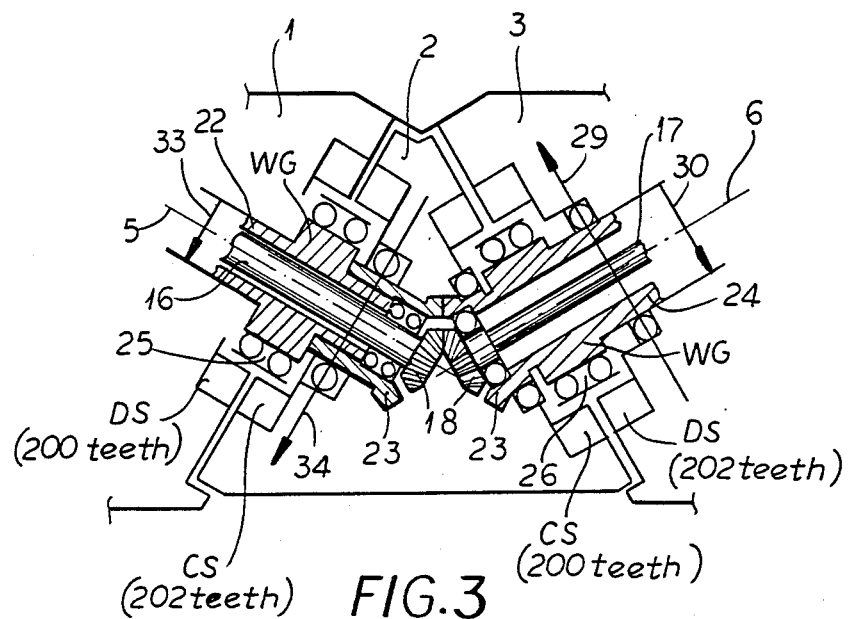
FIG. 3 is a detail view of the center of FIG. 2.

As illustrated in FIG. 3 this difference is obtained in the transmission 25 by driving the wave generator WG with the shaft 22, by securing the dynamic spline DS (the ring gear with the same number of teeth as the flexspline) on the rear segment 1, securing the circular spline CS (the ring gear with more teeth than the flexspline) on the segment 2, and using a stepdown of 101:1 by having 200 teeth on the dynamic spline DS and 202 teeth on the circular spline CS.

On the other hand the transmission 26 is oppositely set up with a 202-tooth circular spline CS fixed on the intermediate segment 2 and a 200-tooth dynamic spline DS secured to the front segment 3 and using a stepdown of 100:1. The rotation of the segment 3 as shown by arrow 29 is opposite to the rotation direction of the segment 2 as shown by arrow 30. Meanwhile the rotation directions 33 and 34 of the shaft 22 and segment 2 are the same as the direction 30. The difference between the two stepdown ratios i is effected by the relative movement of the segments 2 and 3 whose gears 23 roll compensatingly off on each other.

Thus if, for instance, the shaft 22 were immobilized and the segment 2 were rotated about its axis 5, the shaft 24 would be rotated by the gears 23. This additional rotation of the shaft 24 ensures that the segments 2 and 3 follow angular movements of the same magnitude, albeit in opposite directions.

Figure 4:
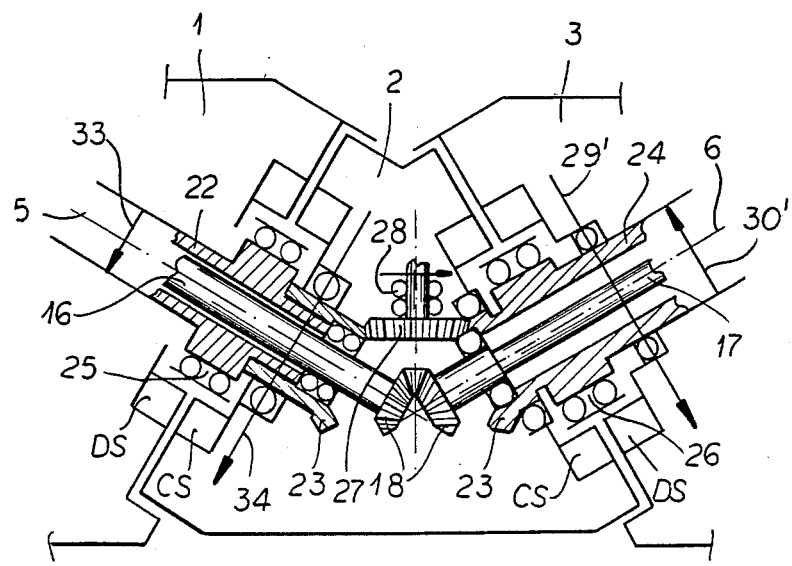
FIG. 4 is a detail view through the center of a second embodiment of the assembly.

In FIG. 4 the rotation of the segments 2 and 3 is in the same direction. Here the transmission 25 is set up as in FIG. 3, with its dynamic spline DS secured to the segment 1 and circular spline CS to the segment 2 for a 101:1 reduction and codirectional rotation of the shaft 22 and segment 2.

The other transmission 26 is also set up identically to FIG. 3, with its circular spline CS on the segment 2 and dynamic spline DS on the segment 3 for a 100:1 reduction and opposite rotation of the shaft 24 and segment 3.

Between the two gears 23, however, is another bevel gear 27 carried in the segment 2 in a bearing 28. Thus in this arrangement the two segments 2, 3, will turn through the same angle and in the same direction 29' as the shaft 22 but opposite to the direction 30' of its shaft 24.

Figure 5:
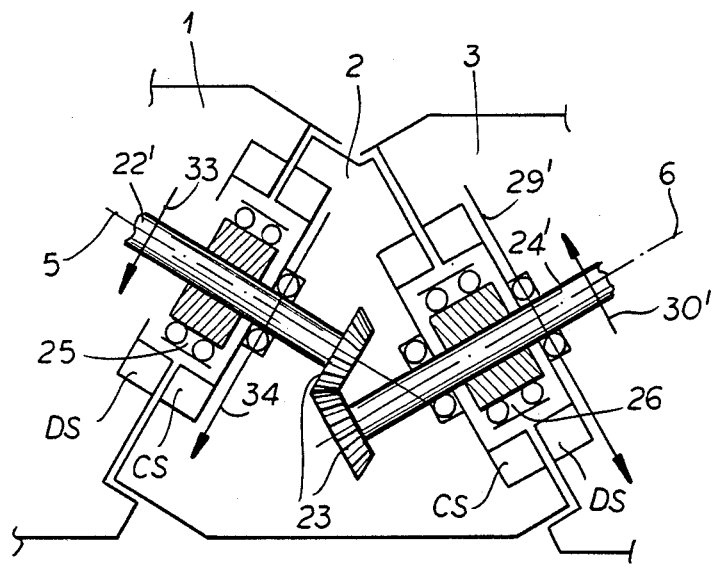
FIG. 5 is a detail view through the center of a third embodiment of the assembly.

In the system of FIG. 5 (and also of FIGS. 6, 7, and 8) the tool holder 7 does not need to be rotated so that the shafts 22' and 24' are core shafts. The kinematics of the FIG. 5 arrangement are otherwise identical to that of FIG. 4, with both 202-teeth circular splines CS of both transmissions 25 and 26 being on the segment 2 and the 200-teeth dynamic splines DS being on the segments 1 and 3.

However, the gears 23 are identical but mesh laterally for a change in direction like that effected by the gear 27 so that the direction 29' is identical to the directions 33 and 34.

Figure 6:
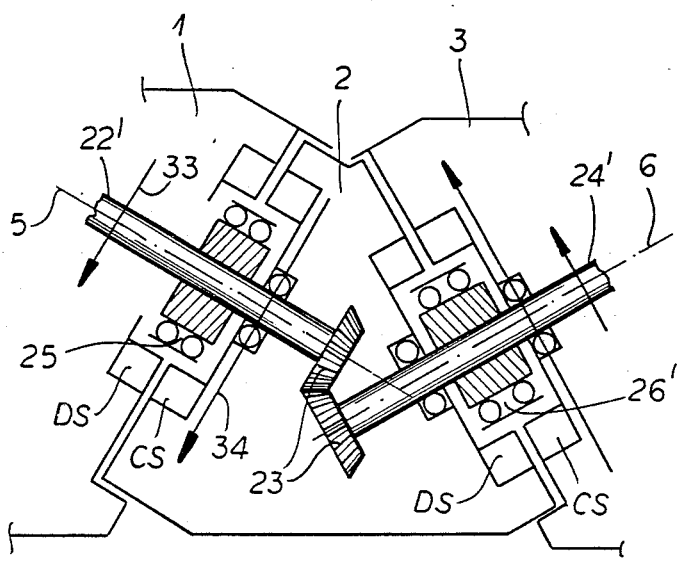
FIG. 6 is a detail view through the center of a fourth embodiment of the assembly.

In FIG. 6 a 202-teeth dynamic spline DS of the transmission 26' is fixed on the seqment 2 and a 204-teeth circular spline CS is fixed on the segment 3 for rotation of the segments 2 and 3 in the opposite directions, as in FIG. 3.

To obtain identical rotation angles the circular spline CS of the stepdown transmission 25' has 204 teeth and the respective dynamic spline DS only has 202 teeth. This gives the following relationship for the system with Z representing the number of teeth:

$$i = Z_{CS}/(Z_{CS} - Z_{DS}) = 204/(204 - 202) = 102.$$

Thus it is evident that the stepdown transmission 25' once again has a stepdown that is one revolution more than that of the stepdown transmission 26'. In this latter transmission 26' the dynamic spline is on the segment 2 so as to give the ratio i=101:1 with identical rotation directions of the shaft 24' and the segment 3.

Figure 7:
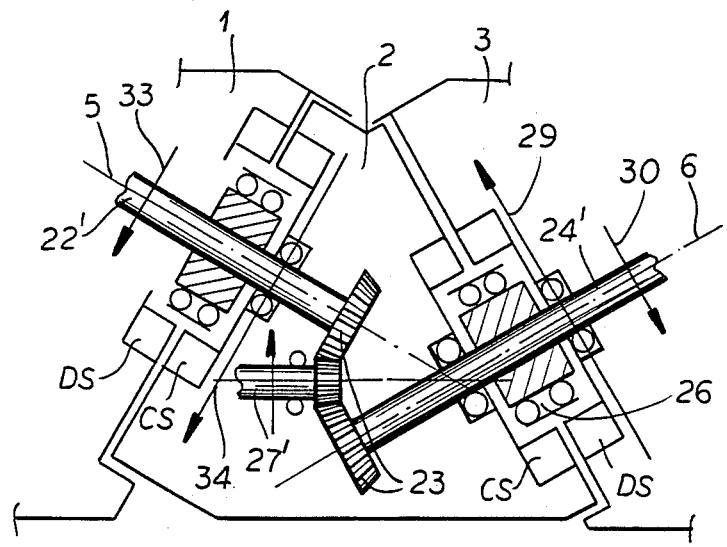
FIG. 7 is a detail view through the center of a fifth embodiment of the assembly.

FIG. 7 shows an arrangement wherein the same parts are used as in FIG. 6, plus a reversing gear 27' between the gears 23 so that the relative directions correspond to those of FIG. 3, that is the segments 2 and 3 rotate equally but oppositely. The gear 27' therefore compensates for the relative movement of these segments 2 and 3.

Figure 8:
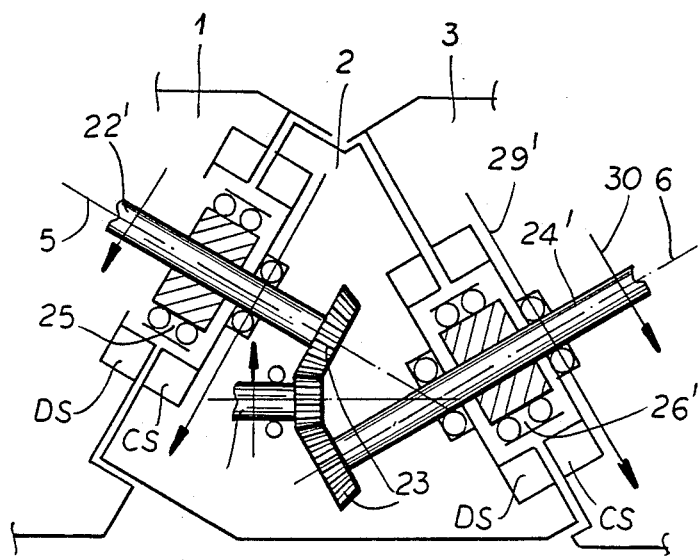
FIG. 8 is a detail view through the center of a sixth embodiment of the assembly.

In FIG. 8 the system is identical to that of FIG. 7 except that the outer transmission 26' is reversed as in FIG. 6 with its circular spline CS on the segment 3 and its dynamic spline DS is on the segment 2. Thus the segment 3 rotates in direction 29' which is the same as the directions 33 and 34 of the shaft 22 and segment 2.

The arrangements of FIGS. 3 through 8 would also work if the dynamic splines and circular splines of each transmission were switched with one another. This would give the transmission 25 a ratio i of $(x-1)$ and the transmission 26 the ratio i of x. The result would be opposite rotation of the segments 2 and 3 from that illustrated. It is also within the scope of this invention to use transmissions other than of the harmonic type, for instance planetary ones, to achieve the novel effect of this invention.

I claim:

1. A head assembly for a manipulator, the assembly comprising:

a rear segment rotatable about a rear axis fixed relative to the manipulator and extending through the rear segment;

an intermediate segment;

intermediate pivot means for supporting the intermediate segment on the rear segment for rotation relative to the rear segment about an intermediate axis fixed relative to the rear segment and intersecting the rear axis at an acute intermediate angle;

a front segment having a holder adapted to carry a tool;

front pivot means for supporting the front segment on the intermediate segment for rotation about a front axis fixed relative to the intermediate segment, extending through the front segment, and intersecting the rear axis at an acute front angle; and drive means for rotating the intermediate and front segments on the rear segment about the intermediate axis and for simultaneously rotating the front segment about the front axis, the drive means including:

an intermediate shaft extending along the intermediate axis, a front shaft extending along the front axis, angle gearing interconnecting the intermediate and front shafts for joint synchronous rotation, an intermediate stepdown transmission with a high stepdown ratio of N:1 connected between the intermediate shaft and the intermediate segment for relatively slowly rotating the intermediate segment relative to the rear segment, and a front stepdown transmission with a high stepdown ratio of (N+/−1):1 connected between the front shaft and the front segment for relatively slowly rotating the front segment relative to the intermediate segment, N being a whole number, whereby the drive means counter rotates the front segment relative to the intermediate segment by an amount which cancels discrepancies introduced into the movement of the front segment by the movement of the intermediate segment relative to the rear segment.

2. The head assembly defined in claim 1 wherein both transmission are identical, are of the harmonic type, and each have circular and dynamic splines, the circular splines being connected to the intermediate segment.

3. The head assembly defined in claim 1 wherein the transmissions are of the harmonic type but the intermediate transmission has splines with a different number of teeth from the number of teeth of the splines of the outer transmission.

4. The head assembly defined in claim 1, further comprising a tool holder rotatable on the front segment about an axis intersecting the front axis and forming therewith a tool angle open away from the intermediate segment;

respective secondary rear, intermediate, and front shafts separate from the first-mentioned rear, intermediate, and frotn shafts and extending along the respective axes in the respective segments; and secondary angle gearing independent of the first-mentioned angle gearing and interconnecting the secondary shafts in a train with the tool holder for joint rotation.

5. The head assembly defined in claim 1 wherein both transmissions are identical, are of the harmonic type, and each have circular and dynamic splines, the dynamic splines being connected to the intermediate segment.

* * * * *